United States Patent [19]
Brelsford et al.

[11] Patent Number: 5,230,069
[45] Date of Patent: Jul. 20, 1993

[54] APPARATUS AND METHOD FOR PROVIDING PRIVATE AND SHARED ACCESS TO HOST ADDRESS AND DATA SPACES BY GUEST PROGRAMS IN A VIRTUAL MACHINE COMPUTER SYSTEM

[75] Inventors: David P. Brelsford, Hyde Park, N.Y.; Melvin M. Cutler, Los Angeles, Calif.; Jean-Louis Lafitte, Moens, France; Joseph M. Gdaniec, Hyde Park; Damian L. Osisek, Vestal; Kenneth E. Plambeck, Poughkeepsie, all of N.Y.

[73] Assignee: International Business Machines Corporation, Armonk, N.Y.

[21] Appl. No.: 577,395

[22] Filed: Oct. 2, 1990

[51] Int. Cl.[5] .................. G06F 12/00; G06F 12/06; G06F 12/10
[52] U.S. Cl. ................................ 395/400; 395/800; 395/425; 395/500; 364/255.1; 364/255.3; 364/255.7; 364/DIG. 1
[58] Field of Search ............ 395/800, 500, 575, 425, 395/375, 400

[56] References Cited

U.S. PATENT DOCUMENTS

| | | | |
|---|---|---|---|
| 4,128,875 | 12/1978 | Thurber et al. | 395/425 |
| 4,564,903 | 1/1986 | Guyette et al. | 364/300 |
| 4,674,038 | 6/1987 | Brelsford et al. | 395/575 |
| 4,792,895 | 12/1988 | Tallman | 395/375 |

Primary Examiner—Thomas C. Lee
Assistant Examiner—Alpesh M. Shah
Attorney, Agent, or Firm—Lynn L. Augspurger

[57] ABSTRACT

A method and apparatus for providing common access to data spaces by a plurality of virtual machine guests emulated on a host computer system. A token received from a given one of the virtual machine guests is used to identify a particular host data space. The guest also supplies an offset. The offset and the identified host data space are then used to derive a host absolute address representative of a data location in the host data space.

21 Claims, 12 Drawing Sheets

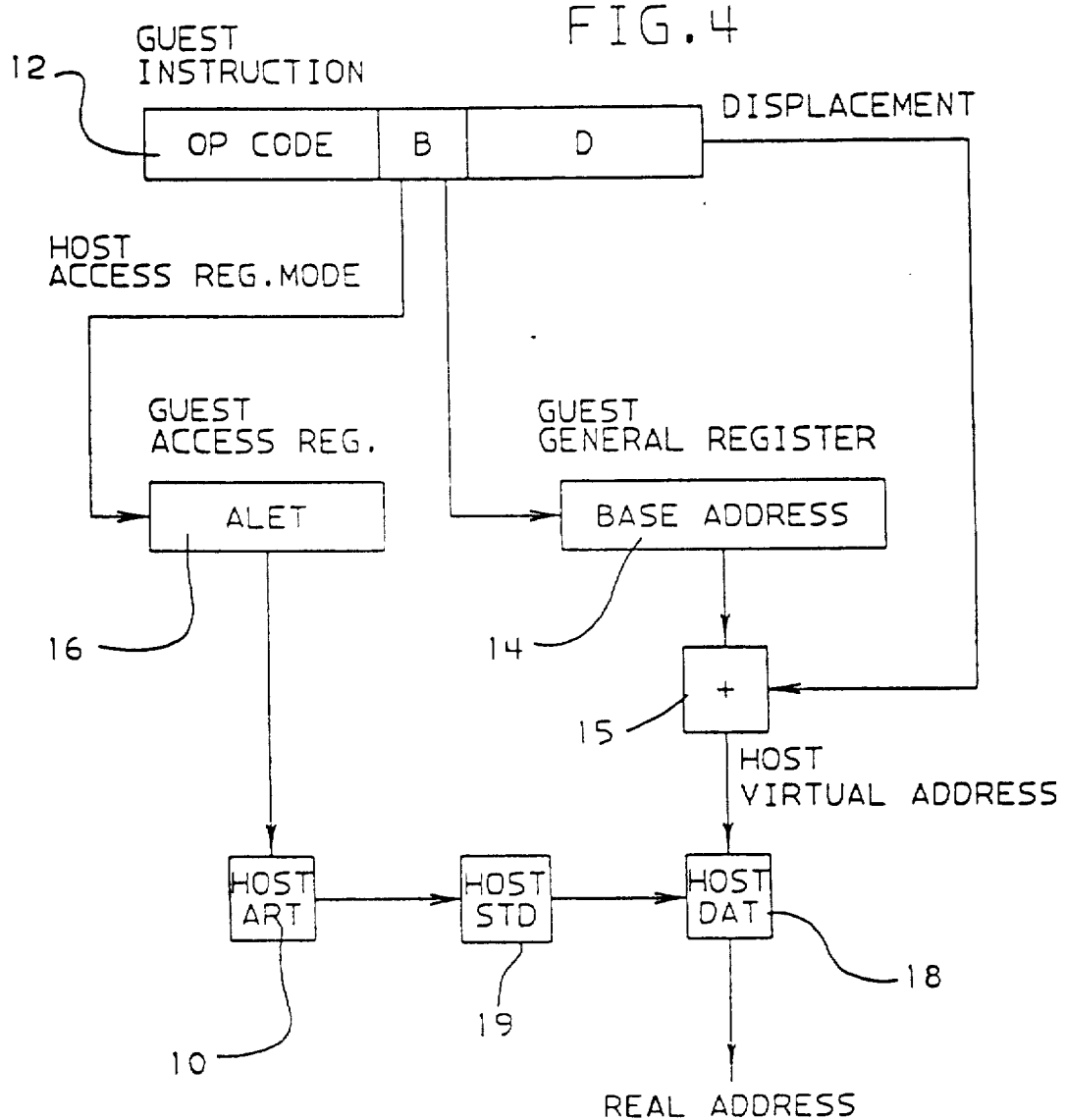
FIG. 4
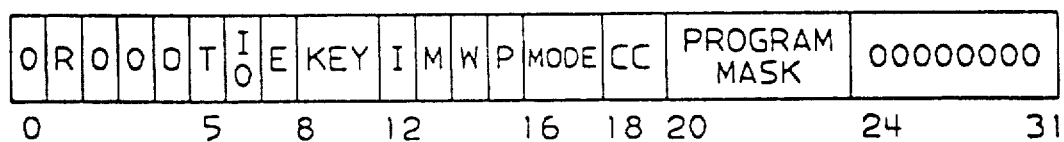
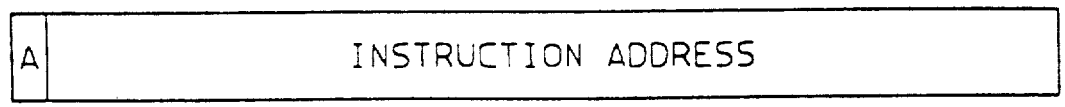
FIG. 7

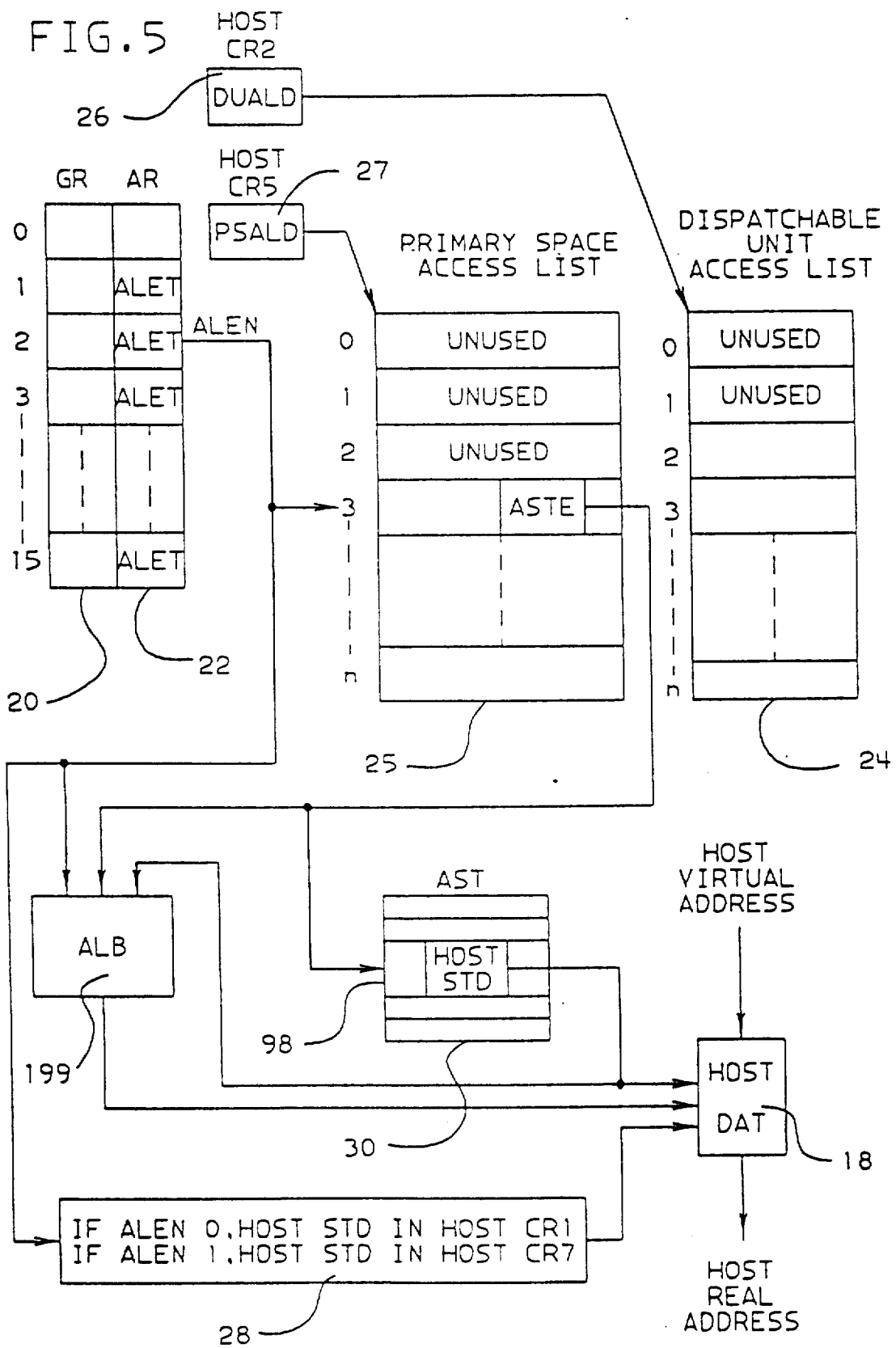

FIG. 6.

HOST CONTROL REGISTERS

| REG. NO. | |
|---|---|
| 0 | M 15 |
| 1 | PRIMARY SEGMENT-TABLE DESIGNATION (PSTD) <br> X 0 \| PSTO [1-20] \| PSTL [25] |
| 2 | DISPATCHABLE-UNIT-CONTROL-TABLE ORIGIN (DUCTO) [0-26] |
| 3 | |
| 4 | |
| 5 | PRIMARY-ASTE ORIGIN (PASTEO) [0-1 ... 26] |
| 6 | |
| 7 | SECONDARY SEGMENT-TABLE DESIGNATION (SSTD) <br> 0 \| SSTO [1-20] \| SSTL [25] |
| 8 | EXTENDED AUTHORIZATION INDEX (EAX) [0-15] |
| 9 | |
| 10 | |
| 11 | |
| 12 | |
| 13 | |
| 14 | |
| 15 | |

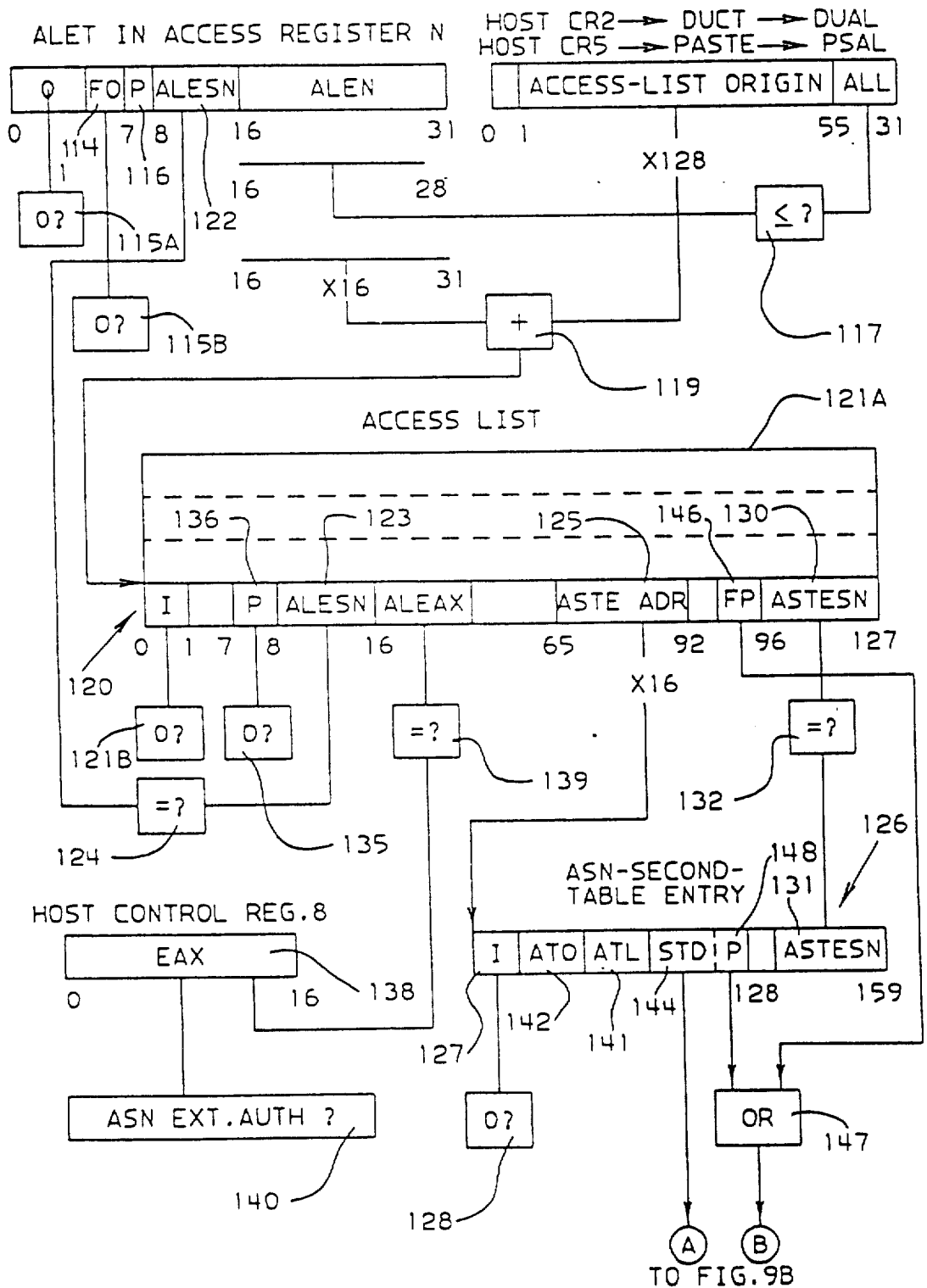
FIG. 9A ACCESS-REGISTER TRANSLATION (ART)

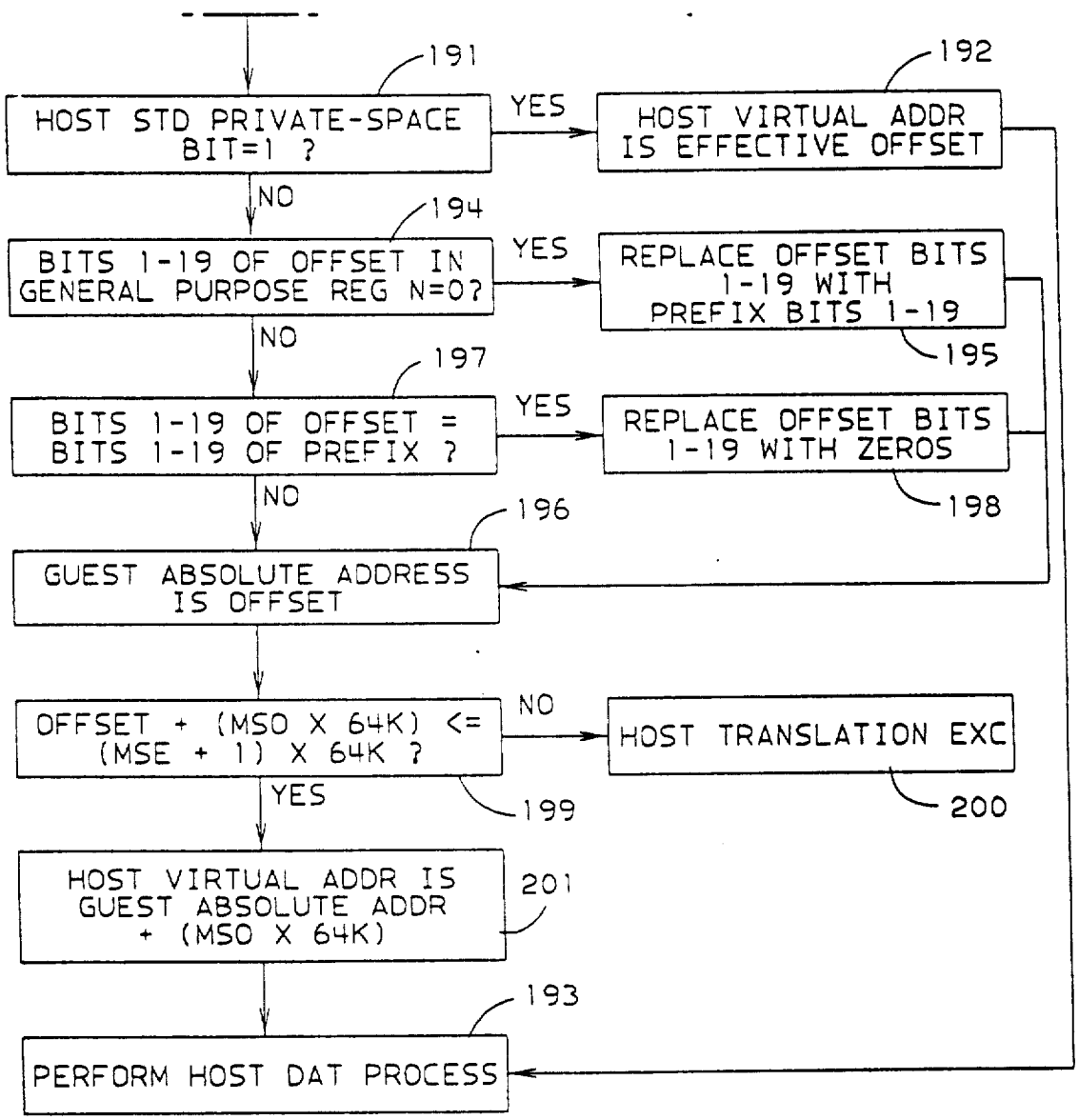
FIG. 10C
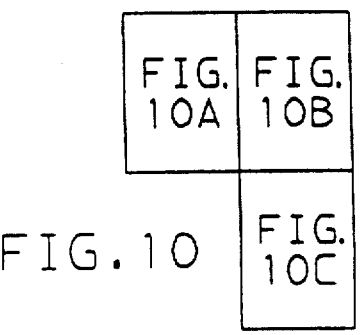

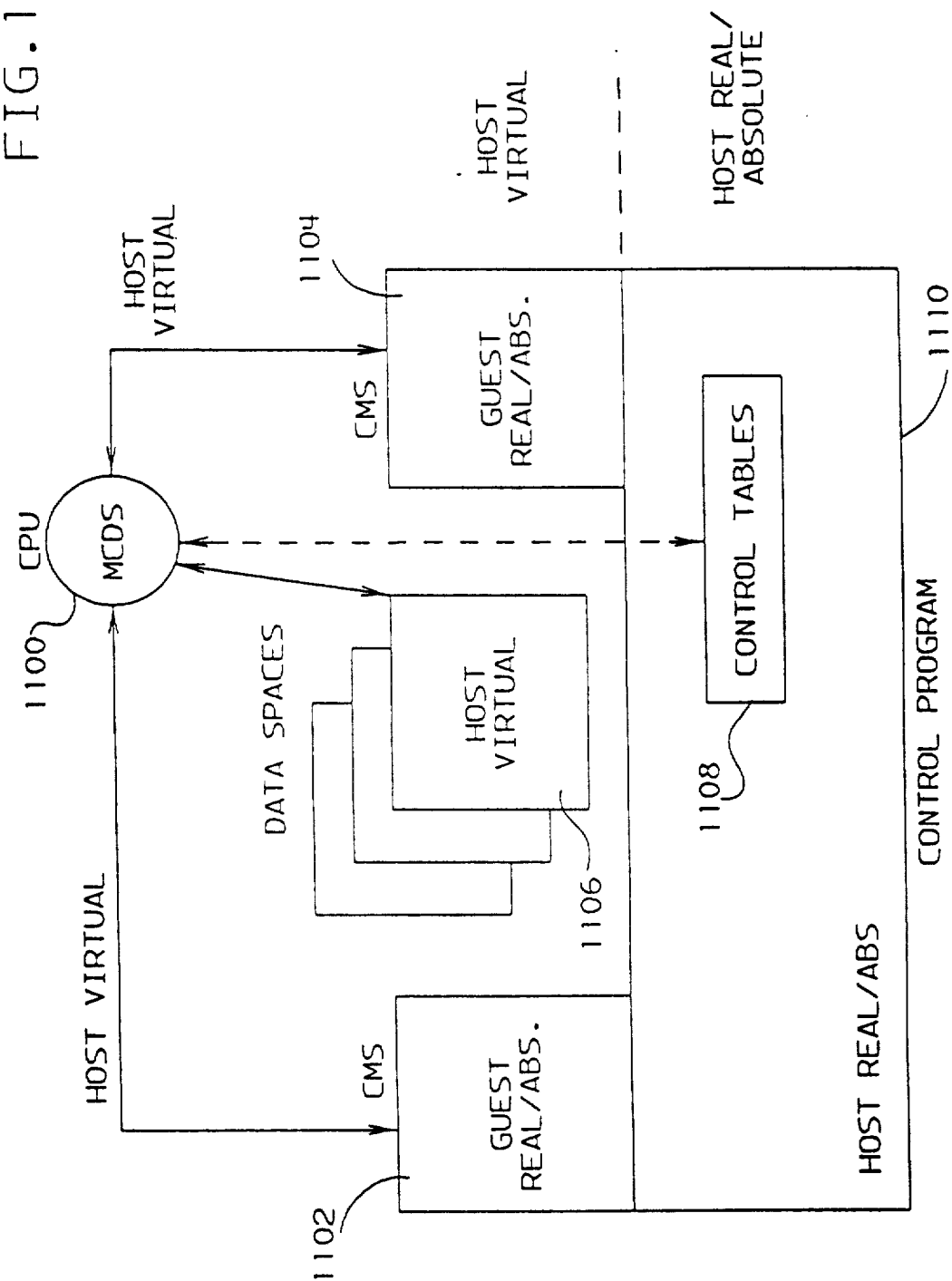

APPARATUS AND METHOD FOR PROVIDING PRIVATE AND SHARED ACCESS TO HOST ADDRESS AND DATA SPACES BY GUEST PROGRAMS IN A VIRTUAL MACHINE COMPUTER SYSTEM

BACKGROUND OF THE INVENTION

1. Field of the Invention

This invention relates to virtual machines.

2. Related Art

The interpretive-execution facility of Enterprise Systems Architecture/370(TM) (ESA/370(TM)) provides the START INTERPRETIVE EXECUTION (SIE) instruction for the execution of virtual machines. Initially created for virtualizing either System/370 or 370-XA architectures, and later for virtualizing ESA/370 architecture, SIE provides capabilities for a number of specialized performance environments. This comprehensive set of capabilities in the architecture serves as the platform for VM/ESA's ability to provide functions in virtual machines for end users and system servers. A virtual machine (VM) system with guest architecture emulation is described in detail in U.S. Pat. No. 4,456,954 to Bullions, III et. al. and assigned to the same assignee as the present invention.

VM/ESA uses the ESA/370(TM) Interpretive-Execution Facility to assign to the processor much of the burden of managing the virtual-machine environment. Within this document, the term GUEST refers to any virtual, or "interpreted," machine. The control program directly managing the real machine, and thus responsible for establishing the guest execution environment, is referred to as the HOST. The host issues a single instruction, START INTERPRETIVE EXECUTION (SIE), which places the machine in interpretive-execution mode. In this mode, the machine provides the functions of a selected architecture. This architecture may also be available on a real machine, such as System/370, 370-XA, or ESA/370, or may be an architecture provided exclusively in the virtual machine environment such as the ESA/XC architecture. The functions provided by the machine include privileged instructions, problem-program instructions, address translation, interruption handling, and timing among other things, and I/O in some cases. The machine is said to INTERPRET the functions that it executes in the context of the virtual machine. Similarly, many types of interruptions are interpreted, presented directly to the guest by the machine, without host intervention.

In the virtual-machine environment the guest program perceives the full complement of functions defined for the designated architecture. Most of those functions are provided in the machine in the form of the interpretive execution facility. However, there remain functions, that are not provided by the interpretive-execution facility. These are provided by the underlying host control program, called CP for VM/ESA, through a process called simulation. Except for performance, simulation endeavors to "execute" guest functions transparently, so that whether a function is performed by the machine or the host is indistinguishable to the guest program.

The operand of the SIE instruction is a control block called the state description. The state description contains information relevant to the current state of the guest. When execution of SIE ends, the guest Program Status Word (PSW) and other information which depicts the state of the guest is saved in the state description before control is returned to the host. This information is used and modified by the host during simulation, and is later used to resume execution of the guest. Other information in the state description determines the mode and other environmental conditions in which the guest is to execute.

While in interpretive-execution mode, a virtual machine is constrained to some portion of the real-machine resources. These resources are allocated by the host. Thus guest storage is confined either to some portion of hot-real storage or to host-virtual-address spaces controlled by the host system. Host enabled and disabled states are generally undisturbed by execution of the guest. Host timing facilities are also undisturbed; instead, a second set is provided for the guest. One complete and logically separate set of control registers is maintained by the machine for use by the host and another is maintained for use by the guest. This protection of the host from interference by the guest permits the host to meet its primary responsibility of efficiently parceling out the real resources to multiple guests. It also prevents one guest from interfering with another guest.

Fundamental to any architecture is the method for providing access to storage. ESA/370 defines three levels of storage address. Dynamic Address Translation (DAT) transforms a virtual address into a real address. Prefixing is performed on a real address to yield an absolute address, which designates a location in physical storage. Prefixing uses the contents of the CPU's prefix register to "swap" addresses 0–4095 with another address range, so that each CPU can have access to different low storage for interruption parameters, save areas, and processor specific data.

The method for representing guest-absolute storage is a key consideration for virtual machines. Two basic storage modes are provided by the interpretive-execution architecture: preferred-storage mode and pageable-storage mode. In preferred-storage mode, a contiguous block is assigned to the guest, whereas in pageable-storage mode, dynamic address translation (DAT) at the host level is used to map guest main storage.

A location in virtual storage is defined by a virtual address and the address space in which it is contained. The segment-table designation, which is usually located in a control register, corresponds to an address space. The Dynamic-Address-Translation (DAT) process converts a virtual address to a real address, by means of a selected entry in the segment table, and a selected entry in the page table designated by that segment-table entry. The result is the real address of the storage frame corresponding to the virtual address.

A virtual-machine environment may call for application of DAT twice: first at the guest level, to translate a guest virtual address through guest-managed translation tables into a guest real address, and then, for a pageable guest, at the host level, to translate the corresponding host-virtual address to a host-real address.

In VM/370, the need to effect two levels of address translation for pageable virtual machines with guest DAT active was satisfied by means of "shadow" translation tables, segment and page tables built by the host reflecting the combined results of the two mappings. The increased addressing capacity offered by 370-XA threatened to limit the performance achievable through "shadow" mechanisms, because of the danger of "sparseness" of address references over the much larger two-gigabyte address range, because of the larger translation-table sizes, and because of the cost to maintain and ensure the integrity of the shadow tables.

These concerns led IBM to forsake shadow tables for general use in interpretive execution, in favor of performing both levels of translation in the machine. This improved method and means of translation is described in detail in U.S. Pat. No. 4,695,950 to Brandt et. al., which is assigned to the same assignee as the present invention. As with the native architecture, translation-lookaside buffers are built into the machine to retain the results of previous address translations, and so speed the resolution of addresses in pages referenced repeatedly.

The native ESA/370 architecture introduced access registers and linkage stacks. These facilities are described, for example, in U.S. Pat. No. 4,945,480 to Clark et al. and assigned to the same assignee as the present invention. The interpretive execution facility makes both of these facilities of the ESA/370 architecture available to guests if they are available on the underlying real machine.

The host is responsible for loading the guest's access register values before starting interpretive execution, and saving them (and restoring host values) afterward. Thereafter, access register translation is performed by the interpretive execution facility at the guest level, before the application of guest DAT. Unlike dynamic address translation, before the present invention, access register translation (ART) was not performed at the host level by the interpretive execution facility.

The conventional address translation process for the class of ESA/370 DAT-on guests is shown in FIG. 1. Guest access register translation is applied to a guest virtual address 112 to derive a guest virtual address 114. Guest dynamic address translation is then applied to the guest virtual address 114 to derive a guest real address 116. The guest real address is then processed in the same manner as a DAT-off pageable mode guest (as will be described by reference to FIG. 3) to derive a host absolute address 110. The application of access register translation at the guest level enables the use of access registers for memory sharing between tasks operating within the context of a single virtual machine, but it does not allow host-controlled memory sharing between tasks operating in different virtual machines.

In ESA/370, as in System/370 and 370-XA, the base (B) or register (R) portion of an instruction operand designates a general register. In ESA/370 access-register mode, the same-numbered access register is used during Access-Register Translation (ART) to determine the address space of the operand.

Access-register translation uses an access-list-entry token (ALET) in an access register to locate an access-list entry (ALE) which, in turn, is used to locate the segment-table designation to be used during DAT. The segment-table designation corresponds to an address space.

On an operating system like MVS/ESA(TM), the access registers bring a powerful capability: that of addressing data in multiple address spaces in a sequence of instructions, or even in the same instruction, without control-program intervention. MVS/ESA runs programs with Dynamic Address Translation (DAT) enabled, so that the logical addresses each program references are translated through MVS-maintained constructs into real addresses. Faults result in interruptions to MVS, which then pages in the required data. In this environment, access registers offer several benefits:

Programs can directly manipulate much larger amounts of data.

The full instruction set can be used to operate on data in any of a great number of spaces.

Individual programs can share data subject to the owning program's permission, enforced by the operating system.

Programs can segregate data more logically, keeping like or related data in the same space, to facilitate controlled sharing.

The capabilities which access registers offer are attractive. However, the structure of VM is substantially different from that of MVS. VM has always been a "two-tiered" system. As illustrated in FIG. 2, the Control Program (CP) component 132 of VM creates a separate virtual machine 126-130 for each logged-on user. Application programs run under the Conversational Monitor System (CMS), a single-user "second level" operating system running within the user's virtual machine. A CMS virtual machine can support an interactive user, a system server like a file-system manager or network spooler, or a private server such as an Advanced Program to Program Communication (APPC) peer.

Under the VM system, CP manages system resources, establishes the virtual machine environment, and enforces isolation among the simulated machines. CMS assumes the responsibility for application services such as file and program management, and for interacting with the end user. CP applies authorization controls to bound the user's (virtual machine's) activities. CP uses architectural facilities like DAT and guest extent checking, as described above, to keep these boundaries secure. Conversely, CMS enforces almost no controls over the application program: Programs under CMS run in (virtual) supervisor state. CMS makes some use of storage keys to prevent inadvertent damage, but a "willful" program can always circumvent CMS and assume control of the virtual machine. According to traditional VM philosophy, each user's machine is his own. CP ensures that an errant or malicious program's acts are confined to the virtual machine in which it is run.

Moreover, CMS manages only the linear storage of a single virtual machine; that is, CMS runs without enabling DAT itself, and does no virtual storage management (paging or swapping). These tasks are CP's domain. CP builds DAT tables and uses them to define each address space representing a virtual machine's storage. These host-virtual address spaces, defined by host DAT tables, map guest-absolute storage.

CMS can be considered to be a member of a general class of guests that runs in pageable mode, without DAT enabled. The address translation process for this class of guests is illustrated in FIG. 3. When a CMS guest needs to access the system memory, it uses a "guest real address" 102. To the "guest real address", guest prefixing is applied to derive a "guest absolute address" 104. A main storage origin (MSO) value is added to the guest absolute address, and the resulting "host virtual address" 106 is then verified to ensure that it is within the main storage extent (MSE). Once the "host virtual address" has been generated and verified, host dynamic address translation is applied to form a "host real address" 108. Host prefixing is then applied to establish a "host absolute address" 110. It is the "host absolute address" that references a physical location in the system memory.

Because of the structure of the CMS class of guests, access register translation, as provided by the interpretive execution facility before the present invention, is not usable by this class of guests. Prior to the present invention, in order to use ART, a guest under VM/ESA CP needed to enable DAT, since ART applies only to virtual addresses. Further, prior to the present invention, the application of access register translation within the VM/ESA environment was limited to use within the address spaces of individual guests who maintained their own access register translation tables and guest ART control registers.

3. Documents Incorporated by Reference

The following patents are incorporated by reference, in their entireties, as if printed in full below U.S. Pat. No. 4,945,480 to Clark et. al., entitled "DATA DOMAIN SWITCHING ON PROGRAM ADDRESS SPACE SWITCHING AND RETURN"; U.S. Pat. No. 4,456,954 to Bullions, III et al., entitled "VIRTUAL MACHINE SYSTEM WITH GUEST ARCHITECTURE EMULATION USING HARDWARE TLB's FOR PLURAL LEVEL ADDRESS TRANSLATIONS"; U.S. Pat. No. 4,695,950 to Brandt et al., entitled "FAST TWO-LEVEL DYNAMIC ADDRESS TRANSLATION METHOD AND MEANS"; and U.S. Pat. No. 4,779,188 to Gum at. al., entitled "SELECTIVE GUEST SYSTEM PURGE CONTROL".

SUMMARY OF THE INVENTION

In light of the foregoing, it is an object of the invention to enable controlled memory sharing across virtual machine boundaries.

It is a further object of the invention to provide individual virtual machines, running without guest dynamic address translation and guest access register translation, with the ability to access multiple host access-register-specified address spaces.

It is still a further object of the invention to provide individual virtual machines, running without guest dynamic address translation and guest access register translation, with the ability to view system memory either disparately or in the same manner depending on the desired operating environment.

In accord with the foregoing objects, there is provided a method and apparatus for providing common access to data spaces by a plurality of virtual machine guests emulated on a host computer system. The apparatus uses a token received from a given one of the virtual machine guest to identify a particular host data space. The guest also supplies the apparatus with an offset. The apparatus uses the offset and the identified host data space to derive a host absolute address representative of a data location in the one of the data spaces.

In the preferred embodiment the apparatus also includes a prefixing means which swaps a range of addresses identified by predetermined offsets with an alternate range of addresses. The prefixing means can be enabled or disabled responsive to a signal from the host computer system (indicated by the state of a bit in a control table accessible by the apparatus). Thus, a number of virtual machine guests can be given the same view of a data space (by disabling guest prefixing) or disparate views of the same data space (by enabling guest prefixing).

Also, a preferred embodiment, a force-private-space bit provides a method to allow these different views of the data space while maintaining a single copy (in the ASTE) of the STD for a user's primary space. The private-space bit in the STD in the ASTE is set to zero to give the appropriate "non-private" view of the space to the owner when host control register (CR) 1 is loaded from this field. The force-private-space bit in the access-list entry of each share is set to one to give each sharer a "private" view of the address space.

BRIEF DESCRIPTION OF THE DRAWINGS

FIG. 4 is a diagrammatic illustration of the use of an access register in addressing operands.

FIG. 5 is a diagrammatic illustration of the application of host access register translation to the contents of a guest access register of FIG. 4.

FIG. 6 depicts the organization and contents of the control registers for use with the MCDS facility of the present invention.

FIG. 7 depicts the contents of the PSW for use with the MCDS facility.

FIGS. 9A and 9B, when taken together, are a diagrammatic illustration of the logic flow of an access register translation process of FIG. 5.

FIGS. 10A through 10C, when taken together, form a flow chart of an access register translation operation and exceptions.

FIG. 11 is a diagram showing the interrelationship between the MCDS facility, the system address spaces, the control program, and multiple CMS users.

DETAILED DESCRIPTION OF THE PREFERRED EMBODIMENTS

Figure 1:
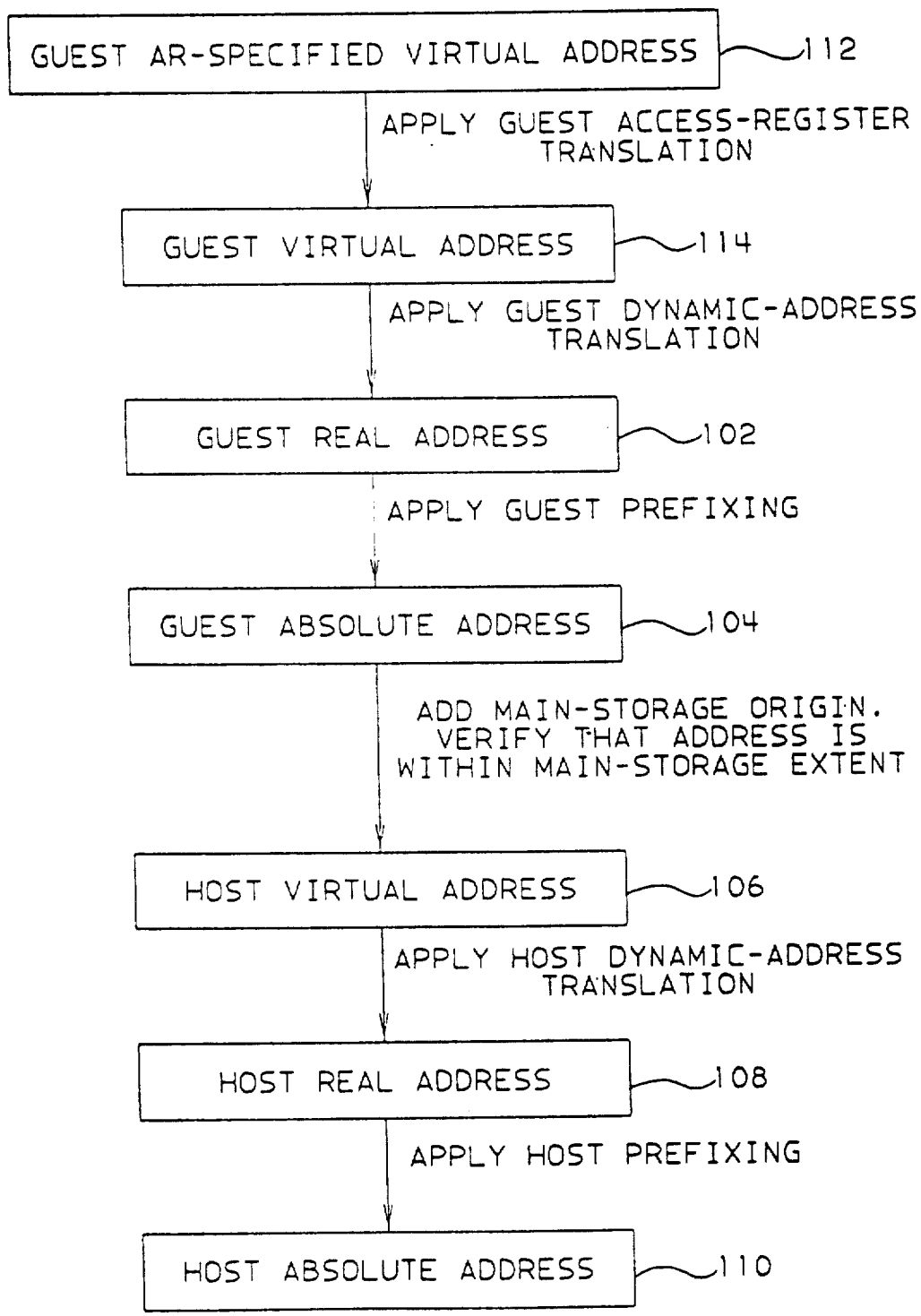
FIG. 1 is a flow chart of the address translation process for ESA/370 DAT-on guests according to the prior art.
Figure 2:
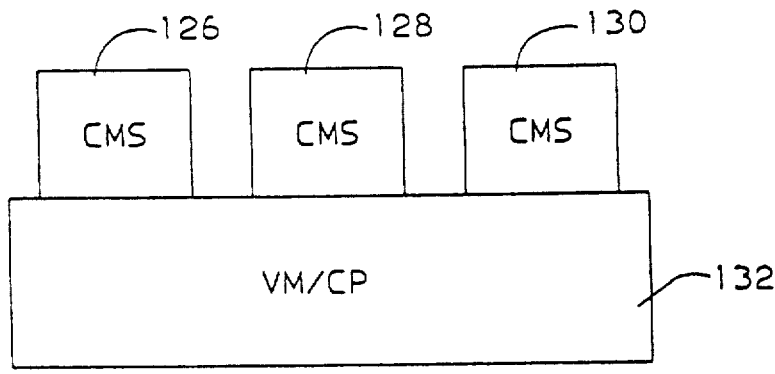
FIG. 2 is a block diagram showing the relationship between the Control Program (CP) component of VM and the virtual machines for each logged-on user according to the prior art.
Figure 3:
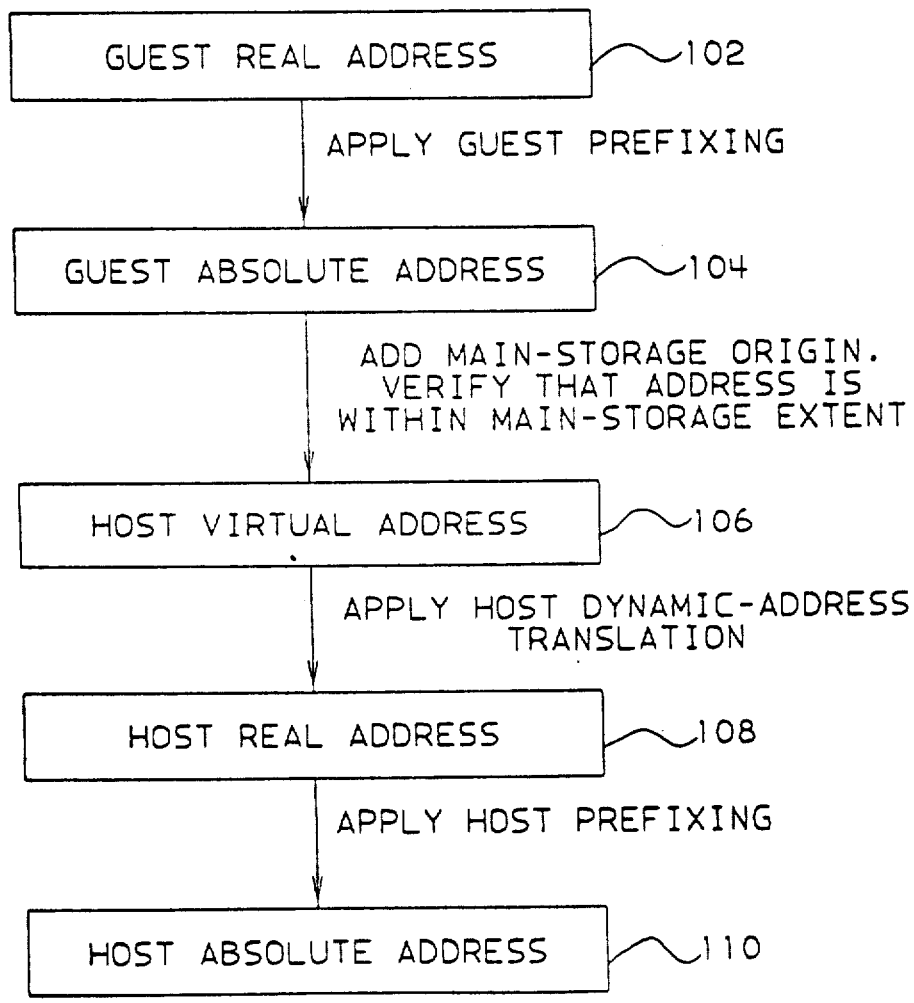
FIG. 3 is a flow chart of the address translation process for pageable mode, ESA/370 DAT-off guests according to the prior art.

The multiple-controlled-data-space facility (MCDS) is an improvement to the interpretive-execution architecture which enables a pageable guest that does not otherwise use dynamic address translation (DAT) to access data in multiple host address spaces. The alternate spaces can be "data spaces" created by this or other virtual machines, or other virtual machines' primary spaces. This memory-sharing mechanism allows far more efficient communication among virtual machines than message-passing protocols allowed.

In short, the border between CP and CMS is the boundary for both authority and virtual-storage management. MCDS is a variation on ESA/370 tailored to VM's unique two tiered structure. It enables CP, the arbiter of authorization, to build the access register translation (ART) constructs which permit individual virtual machines to access multiple host-virtual (i.e., guest-absolute) address spaces. CP can pass back to the virtual machine an ALET designating the access to a space, and the program in the virtual machine (CMS or an application program) can then use that ALET to address an alternate guest-absolute space. Since the ALETs used by the guest are translated through CP's ART constructs, counterfeit ALETs have no adverse effect beyond the authorized scope of the individual guest.

In ESA/370, ART is performed first to identify the address space, and then DAT is performed on that space's tables to find the real address of the data. Likewise, under MCDS, host ART identifies the host-virtual (guest absolute) space, and host DAT then derives the host-real address of the target.

In contrast to the use of access registers by an ordinary ESA/370 guest (e.g., MVS/ESA), MCDS extends the scope of access to all address spaces which CP manages, rather than just those built by the virtual-machine supervisor. It thus enables controlled memory sharing across virtual-machine boundaries. The burden of authorization rests within CP, which cannot be circumvented. Finally, MCDS removes CMS's limit of 2 gigabytes of guest-absolute (host-managed) storage.

The execution of a program instruction may be conveniently divided into two operations. The first operation is the fetching of the instruction to be executed. The second operation is the addressing of operands for the fetching and storing of data on which the instruction operates during its execution.

FIG. 4 shows the use of an access register in addressing operands. The process of using the contents of an access register to obtain a STD for use in dynamic address translation, is called an access register translation (ART) operation, which is generally designated at 10. A guest instruction 12 has an operation code, a B field which designates a general register 14 containing a base address, and a displacement D, which, when joined with the base address of general register 14 by an adder 15, form a host virtual address of a storage operand. In the MCDS host access-register mode, the B field also designates an access register 16 which contains an ALET which, when translated at host ART 10, provides the host STD 19 for the address space in which the data is stored. The Host STD 19 from the Host ART 10 can be joined with the host virtual address from the adder 15, and, when translated together during the host dynamic address translation (DAT) operation, designated generally at 18, provides the host real address of the operand for use by the system. In addition to the B field and displacement D shown in FIG. 1, an R field may be used for designating a general register containing a host virtual address of a storage operand.

Certain instructions, such as MOVE (MVC), specify more than one operand. Each of the operands can be in a different data/address space. Thus, for example, an instruction specifying two operands would include two displacements and two ALETs. It should be understood that under VM, the instructions themselves are in the host primary address space which can be yet a third (different) address space.

FIG. 5 provides an overview showing the translation of a guest ALET and offset to a host real address. Shown at 20 is an array of general registers numbered 0 through 15. An array 22 of access registers, also numbered 0 through 15, are arranged such that each access register is paired with a respective one of the general registers of array 20, as previously described in connection with FIG. 4. An access-list entry number (ALEN) in the ALET selects an entry in one of the access lists 24 or 25. Access list 24 is the DUAL, and access list 25 is the PSAL. In the example of FIG. 5, the ALEN of access register 2 points to entry 3 of the PSAL 25. The origin of the DUAL is specified by a dispatchable-unit-access-list designation (DUALD) 26 which is found by decoding an entry in host control register 2, as will be explained. The origin of the PSAL is specified by a primary-space-access-list designation (PSALD) 27 which is found by decoding an entry in host control register 5, as will be explained. The access-list designation used during ART is known as the effective access-list designation (ALD).

Each entry in the access list includes an ASTE address which points to an ASN second table entry (ASTE) 98. An ASTE may be created and perform its function for ART totally independently of actually being in an AST, although ASTEs used by CP are in an AST. Each ASTE includes a host STD value to determine the host real address by the host DAT 18, as discussed in connection with FIG. 4.

There are two access lists available to a program at the same time, each representing a different capability domain. One access list is called the dispatchable unit access list (DUAL) and the other primary space access list (PSAL). A bit in the ALET determines whether the ALEN of the ALET is pointing to an entry in the DUAL 24 or the PSAL 25.

The DUAL domain is intended to be permanently associated with the dispatchable unit ("task" or "process") on behalf of the program or programs executed by the dispatchable unit. There is a unique DUAL for every dispatchable unit in the system. The DUAL for a dispatchable unit does not change even though the dispatchable unit may execute programs in many different address spaces. The PSAL domain is associated with a host primary address space. All programs which execute in a host primary address space share the PSAL of the address space. This allows programs executing within a primary space to share access to a common set of address spaces. The PSAL changes when the primary address space changes.

A user, in possession of a valid ALET, may access an access list entry on either the DUAL 24 or the PSAL 25, and this entry specifies the desired address space. Other domains may also be implemented and controlled in a similar manner using the ALET and selected control registers. For example, a system wide access list (SWAL) domain may be created having the capabilities of all programs in the system. Various subsets of domains can be constructed as desired, such as a SASN domain access list (SSAL), to allow further exploitation of an existing mechanism.

Entries 0 and 1 of the DUAL are not used because the ALETS are reserved for accessing operands in the primary and the secondary address spaces, respectively, when in the host access register addressing mode. The addressing mode of the CPU is designated by bits in the guest PSW, as will be explained. When the CPU is in the host access register addressing mode, an ALET of zero always refers to the host primary address space and an ALET of one always refers to the host secondary address space. See FIG. 5 in which box 28 identifies these special ALETS and provide the correct host STD for the PASN and the SASN to DAT when they occur. Since the STD values for the host primary and host secondary address spaces are kept in host control registers 1 and 7, respectively (see FIG. 6) access list entries 0 and 1 are not used. As implemented, entries 0, 1 and 2 in the PSAL 25 are unused and are marked invalid.

A host ART lookaside buffer (ALB) 199 receives and saves inputs from the AR 22, the AL 25, and the AST 30 to hold the host STD resulting from host ART. The host ALB also retains the access list designation, DUAL or PSAL. When the same ALET is used again, the host ALB 199 provides the correct output directly to host DAT 18 so that host ART does not have to be repeated.

FIGS. 6 and 7 show the control registers and the PSW word, respectively, for providing information for the control of a program and the state of the CPU during instruction execution.

FIG. 6 shows the contents of the host control registers 0 through 15 for the MCDS facility of the present invention. All of the contents of the host control registers of FIG. 6 will not be discussed, as the majority of them have the identical functions of the control registers of the Multiple Address Space (MAS) and Dual Address Space (DAS) facilities discussed in U.S. Pat. No. 4,945,480 and are thus known. Thus, primarily those changes necessary to provide the MCDS facility will be discussed. Unlike the MAS facility, MCDS does not use the PSW key mask (PKM), the secondary space address number (SSAN), the authorization key index (AX), the primary space address number (PASN), the home segment table designation (HSTD) or linkage stack entry address which are found in various ones of control registers 3, 4 and 13-15 when used by the MAS facility. Host control register 1 contains the primary segment-table designation (PSTD). Bits 1-19 specify the primary segment-table origin (PSTO) and bits 25-31 designate the primary segment-table length (PSTL). Bits 1-25 of host control register 2 designate the dispatchable-unit-control-table origin (DUCTO) used by the MCDS facility to locate the DUALD. Bits 1-25 of host control register 5 designate the primary ASTE origin (PASTEO). The entry in control register 5 points to the ASTE entry for finding the PSAL origin, and other information, in the ASTE for the primary address space.

Host control register 7 includes the secondary segment-table designation (SSTD) in a format wherein bits 1-19 contain the secondary segment-table origin (SSTO) and bits 25-31 contain the secondary segment-table length (SSTL). Bits 0-15 of host control register 8 contain an extended authorization index (EAX) for use by the MCDS facility of the present invention.

Each of the guests also includes its own set of control registers. When MCDS is installed, a mode control bit in the SIE state description is used by the host control program to specify MCDS mode for a guest. A 1 in bit 15 of guest control register zero enables a guest in MCDS mode to use the MCDS capability.

FIG. 7 shows the format of the guest program status word (PSW). Bit 5 of the PSW is a DAT mode bit (T) which defines if the guest DAT is active. For an MCDS guest, guest DAT is always off. Thus for an MCDS guest, bit 5 of the guest PSW is required to be 0. Bits 16 and 17 are combined to specify the addressing mode. When in MCDS mode, the combination of guest PSW bits 16 and 17 define if the CPU is in the host primary space mode (00), or host access-register mode (01). Bit 32 of the PSW is an addressing mode bit which defines the format of the instruction address in bits 33 through 63 of the PSW. The function and format of the remainder of the fields in the PSW are well understood and defined for IBM System/370 Operations.

The format of the ALET discussed in connection with FIG. 5 is best shown at block 100 of FIG. 9A. This token is obtained by the guest through the use of VM/ESA services. In the ALET, bit 7 is a primary-list bit 116 which, when 1, indicates that the ALEN refers to a PSAL. When the primary-list bit 7 is 0, the ALEN refers to the DUAL. Bits 16-31 contain the ALEN referred to in FIG. 5. When the ALEN is multiplied by 16, the product is equal to the number of bytes from the beginning of the effective access-list to the designated access-list entry. During ART, an exception is recognized if the ALEN designates an entry that is outside of the effective access-list or if the left most 7 bits of the ALET are not all zeroes. The access-list entry is outside of the effective access list if the ALEN points to an address past the end of the access-list as determined by the access-list length (ALL) of the effective ALD. The described format of th ALET does not apply when the ALET is 00000000 or 00000001 (hexadecimal notation), since these values have been assigned a special meaning by the ART process.

An ALET can exist in an access register, in a general register or in storage, and it is not protected from manipulation by a user's problem program. Through the use of instructions, any program can transfer the value of an ALET back and forth between access registers, general registers and storage. A called program can save the contents of the access registers in any storage area available to it, load and use the access registers for its own purposes, and then restore the original contents of the access registers before returning to its caller. Bits 8-15 of the ALET contain an access-list-entry sequence number (ALESN). Since the ALET is not protected from the problem program, and a user may inadvertently change its contents to any value, the ALESN is included in the ALET as a reliability mechanism that is checked during host ART.

The format of an access-list entry (ALE) as used in connection with the access register translation of FIG. 5 is best shown at block 120 of FIG. 9A. Bit 0 of the ALE is an invalid bit which indicates when the ALE is not valid. Bit 7 is a private bit which, when 0, specifies that any program is authorized to use this access-list entry during a host ART operation. When bit 7 is 1, an access-list extended authorization index (ALEAX) value in bits 16-31 of the ALE is used to determine if a calling program is authorized to use this access-list entry. The ALE includes an ALESN value in bits 8-15, which is compared to the ALESN value of the designating ALET to make a validity check. Bits 65-89 of the ALE contain the corresponding ASTE address of the associated address space. An ASTE sequence number (ASTESN) is located in bits 96-126 of the ALE for use as a validity check in connection with the ASTE entry, to be discussed.

It is intended that entries in the access-lists 24 and 25 (FIG. 5) be provided by CP such that they may be protected from direct manipulation by any guest. This protection may be obtained by means of key-controlled protection or by placing the access-lists in real storage not accessible by any guest program by means of DAT. As determined by bit 0 in the entry, an ALE is either valid or invalid. A valid ALE specifies an address space that can be used by a suitably authorized program to access that address space. An invalid ALE is available for allocation, or reallocation, as a valid entry. The control program provides services that allocate valid ALEs and that invalidate previously allocated ALEs.

Allocation of an ALE comprises the following steps. A guest passes the identification of an address space to the control program (CP), and it also passes an indicator specifying either the DUAL 24 or the PSAL 25. This indication is the primary list bit 7 of the ALET. The control program then checks the authority of the guest program to access the address space, as will be explained. If the guest program is authorized, the control program selects an invalid entry in the specified access list, changes it to a valid entry, includes the ASTE address and ASTESN thereby specifying the subject address space, and returns to the guest program the value of an ALET which designates the now allocated ALE. The guest program can then place the new ALET in an access register in order to access the address space. Later, through the use of the invalidation service of the control program, the ALE that was allocated may be made invalid.

In this way, a particular ALE can be allocated, then invalidated, and then reallocated, this time specifying a different address space then was specified in the original allocation. To guard the user against erroneous use of an ALET that designates a conceptually wrong address space, the ALESN can be stored in both the ALET and the ALE. When the control program allocates an ALE, it places the same ALESN in both the ALE and the designated ALET that it returns to the problem program. When the control program reallocates an ALE, it may change the value of the ALESN in the reallocated ALE such that the value of the ALESN of previously designated ALETs no longer matches the ALESN in the new ALE.

Although the ASTESN portion of the ALE will be discussed further in connection with the ASTE and the associated figures, it is important to note here that comparison of the ASTESN value in the ALE with the value in the ASTE is the mechanism by which the ALE authority to designate the ASTE is confirmed. Thus, an ASTE can be reassigned and a different ASTESN assigned to control its use without having to back track to all ALE entries which have referenced the ASTE. Through use of the ASTESN the control program does not have to retain every program or dispatchable unit which was able to use the ASTE. Thus, the authority can be changed by changing the ASTESN and exceptions or interruptions generated when an attempt is made to use the ASTE without the proper ASTESN. This allows the operating system to be made aware of attempts to access the ASTE with a capability granted in an ALE at a time before the ASTESN was changed. Thus, an operating system has a mechanism to safely reuse an ASTE for a new and/or different space, or to revalidate the authority of the current assessors of an existing space to use it.

Under MCDS, a guest may be in either host-primary-space mode or host-access-register mode as determined by bits 16 and 17 of the guest PSW. Each mode determines how guest operand addresses are translated. In host-primary-space mode, guest operand addresses are resolved in the host primary address space. In host-access-register mode, guest operand addresses are resolved in any of up to 16 different address spaces concurrently. In either mode, instructions are fetched and executed in the host primary address space.

Advantageously, the two above described modes of operation enable a guest to run one or more programs that do not use access register translation, without the guest itself having to leave MCDS mode.

Address translation in host-primary-space mode is identical with address translation for a pageable guest in ESA/370 mode with guest DAT off as illustrated in FIG. 1. The contents of guest access registers are ignored, and host access register translation is not applied.

Figure 8:
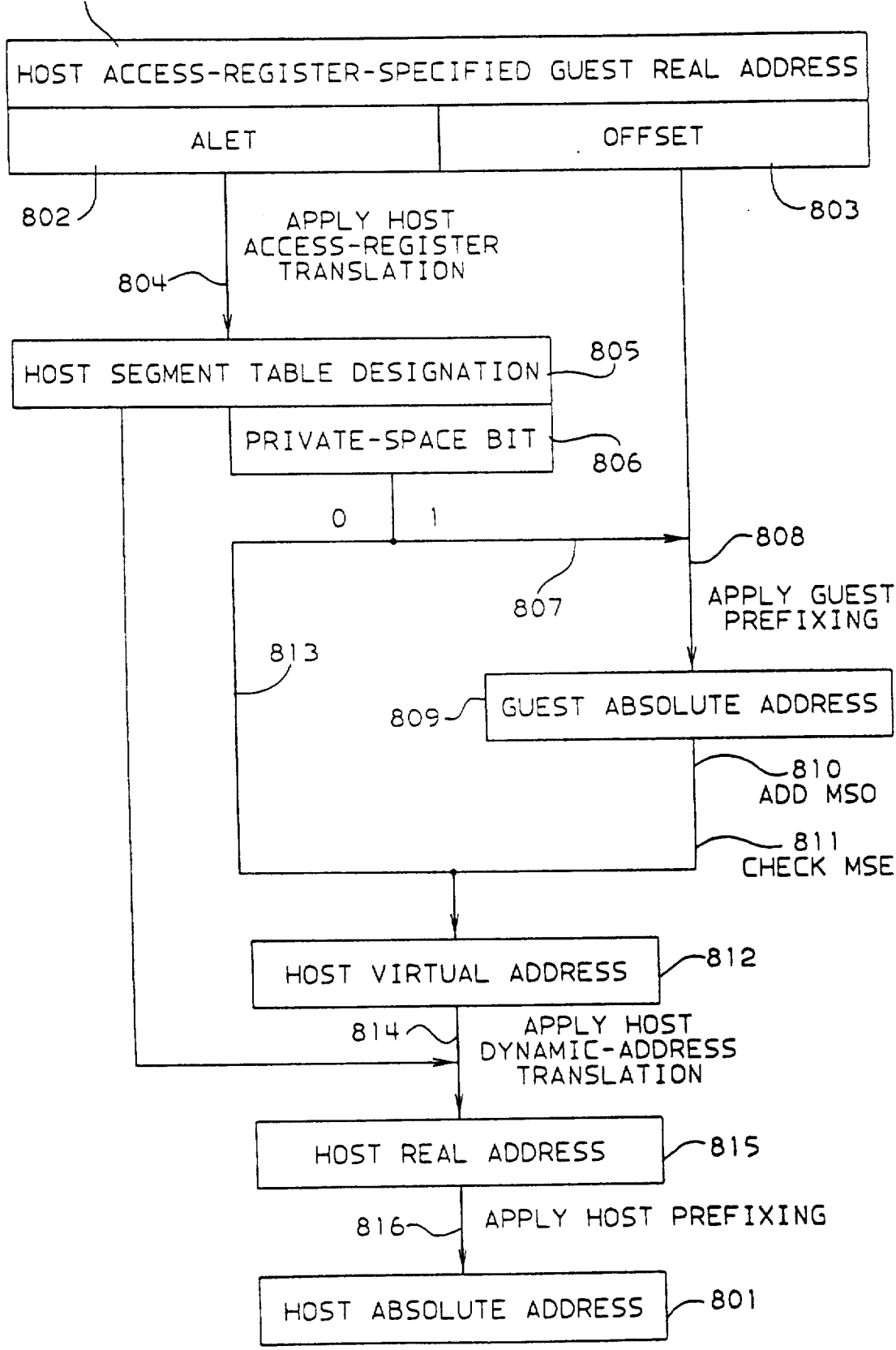
FIG. 8 is a diagramatic illustration of the address translation process for an MCDS host access-register mode guest.

The operation of an MCDS host-access-register mode guest is illustrated in FIG. 8. When a guest is in host-access-register mode, operand addresses are called host-access-register-specified real addresses. Guest access register translation and guest dynamic address translation are not used. Instead, host access-register-specified real addresses are translated through host access register translation and host dynamic address translation to produce a host-real address As illustrated in FIG. 8, a host access-register specified real address comprises an access-list-entry token (ALET) 802 and an offset 803. The ALET 802 is contained in an access register designated by an instruction B or R field that is used to specify the real address of a storage operand. The ALET 802 is used during host access register translation 804 (described later) to produce a host segment-table designation (STD) 805. The host segment-table designation 805 determines the address space in which the specified offset 803 resides. The private space bit 806, which is part of the host STD, is used to determine if guest prefixing, main storage origin (MSO) and main storage extent (MSE) are applied. If the private space bit 806 in the host segment-table designation 805 is 1 (at 807), then guest prefixing (described later) is applied at 808 to the offset 803 to produce a guest absolute address at 809. In addition, if the private space bit 806 is 1, the effective main-storage origin in the state-description-control block is added at 810 to the guest absolute address, and the resultant address is compared with the effective main storage extent in the state description control block at 811 to determine if the resultant address is valid. This resultant address is a host virtual address 812. If the private space bit 806 is 0 at 813, then the unaltered offset 603 is a host virtual address 812. The host virtual address 812 is used with the host segment-table designation 805 during the host dynamic-address translation (host DAT) at 814 to produce a host real address 815. The host real address is then used during host prefixing at 816 to produce a host absolute address 801. The host absolute address is the address assigned to a host main storage location.

Figure 9B:
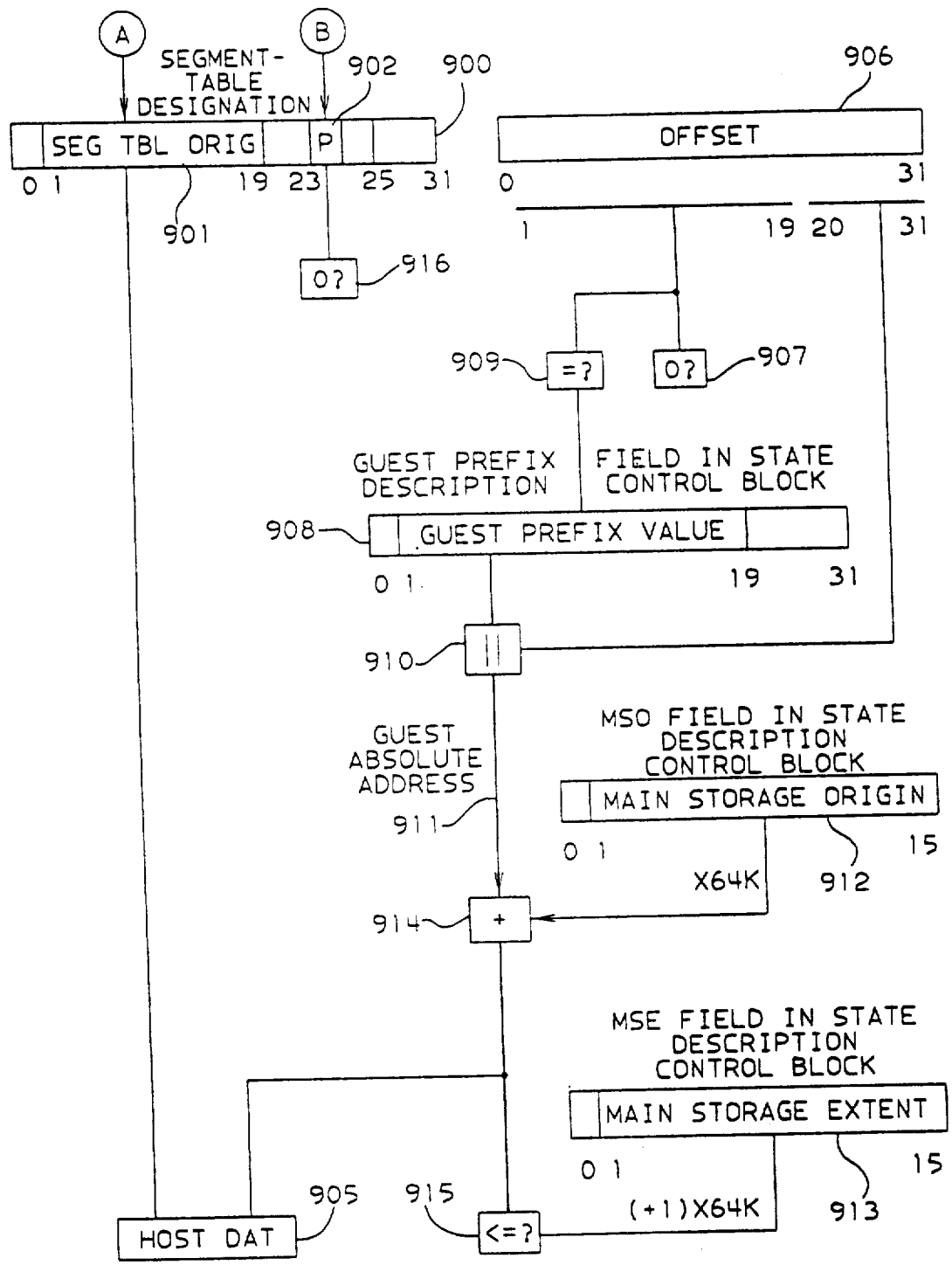

FIGS. 9A and 9B, when taken together, are a diagrammatic illustration of the host access register translation process under MCDS with program authorization checks. When an ALET is used in an access register operation to fetch or store an operand, bits 0–6 of the ALET are examined at 115 to insure that the ALET is valid. If the P-bit 116 in the ALET is 0, the access list is a DUAL, and if the P-bit 116 is 1, the access list is a PSAL. If the access list is a DUAL, the effective ALD is fetched from the DUCT whose address is stored in host control register 2. If the access list is a PSAL, the effective ALD is fetched from the primary ASTE (PASTE) whose address is stored in host control register 5. The effective ALD includes an access list origin and an access list length (ALL). At 117, the ALEN is compared to the ALL to determine that the ALEN is not outside the bounds of the access list. If the ALEN passes this validity check, the effective access-list origin is joined with the ALEN by an adder operation at 119 to find the address of the ALE 120 in the access list 121A. The invalid bit, bit 0 of the ALE 120, is checked at 121B to see if it is 0, thereby determining if the ALE 120 is valid. If the ALE 120 is valid, the ALESN 122 of the ALET is compared to the ALESN 123 of the ALE 120 at 124. If the ALESN 122 is equal to the ALESN 123, the ALET is still authorized to designate the ALE 120, and the ASTE address 125 is used to fetch the ASTE 126. The validity of the ASTE 126 is confirmed by checking the invalid bit 127 at 128. If the ASTE 126 is valid, the ASTESN 130 is compared with the ASTESN 131 at 132 to insure that the ALE 120 is still authorized to designate the ASTE 126. These checks complete the validity portion of the ART.

The authority of the calling program to access the address space is now checked. The first check is made at 135 to determine if the P bit 136 is 0. If the P bit of 136 is 0, all programs are authorized to access the address space associated with the ALE, and no further checks are made. If the P bit 136 is 1, the ALEAX 137 is compared to the EAX 138 in host control register 8 by the comparator 139. If the comparison at 139 is equal, then the program is specifically authorized to access the address space, and no further checks are made. If the comparison at 139 is not equal, then an ASN extended authorization check is made at 140. The ASN extended authorization check 140 is made by comparing the EAX in host control register 8 with the authority table length (ATL) 141 to make sure that the EAX does not designate an entry outside of the bounds of the authority table. The EAX located in host control register 8 is used as an index into the authority table whose origin is ATO 142. If the S bit in the authority table is set equal to 1 for that EAX, then the program is authorized to have access into the address space.

If the program is authorized to have access to the address space, as thus far described, and the access is to be a store access, then the fetch-only bit at 114 in the ALE is checked as shown at 115B. If the fetch-only bit is zero, the store access is permitted. If the fetch-only bit is one, a protection exception for access list controlled protection is recognized.

If the program is still authorized to have access to the address space (for either a store or a fetch access) the host STD 144 is obtained from the ASTE 125. The host STD is modified at 147 by logically ORing the force private space bit 146 of the ALE with the private space bit 148 of the host STD 144 and the result replaces the private space bit in the host STD supplied to the guest prefixing and host DAT operations as shown in FIG. 9B. The remaining bits of the host STD 144 remain unchanged.

FIG. 9B is a diagrammatic illustration of the prefixing, main-storage-origin application and main-storage-extent checking processes. The host STD at 900 which is obtained from the host ART process in FIG. 9A includes a segment table origin at 901 and a private-space bit at 902. The segment-table origin is used during the host DAT process at 905. The private-space bit is used to determine if guest prefixing, guest main-storage-origin application and guest main-storage-extent checking are performed. If the private-space bit at 902 is 1, then the effective offset at 906 is used by the host DAT process at 905 without the application of guest prefixing, main-storage-origin addition and main-storage-extent checking. That is, the offset at 906 is used directly by the host DAT process at 905. If the private-space bit at 902 is 0 at 916 then bits 1–19 of the offset are checked for all zeros at 907. If bits 1–19 of the offset are all zeros, then bits 1–19 of the guest prefix field in the state description control block at 908 are used to replace bits 1–19 of the effective offset and bits 20–31 of the effective offset are concatenated on the right at 910 to produce a guest absolute address at 911.

If bits 1–19 of the effective offset are not all zeros and are equal to the guest prefix value at 909, then bits 1–19 of the effective offset are replaced with zeros and bits 20–31 of the effective offset are concatenated on the right at 910 to produce a guest address at 911. If bits 1–19 of the effective offset are not all zeros and are not equal to the guest prefix value, then the entire offset remains unchanged and is considered a guest absolute address at 911. Further, when the private-space bit at 902 is 0 at 916, the guest absolute address is added at 914 to the effective main-storage origin at 912, and the result is compared with at 915 the effective main-storage extent value of the state description control block at 913. If the resultant address is less than or equal to the effective main-storage-extent value, then the resultant address is valid and is used during host DAT at 905.

MCDS extends the function of the ESA/370 private-space bit. If a virtual machine creates a data space, it is inappropriate to apply prefix-related protection mechanisms to that data space. Among separate user virtual machines, all sharers should be able to use the same address to reach the same location in the data space. Therefore, MCDS extends the effect of the private-space attribute to suppress prefixing. In the same way, the size of the virtual machine's primary space, specified by the main-storage extent in the state description, has no bearing on the size of other spaces it may access; thus, the MCDS private-space control suppresses the application of main-storage-extent checking. In short, the private-space attribute gives each sharer of a data space the same "view" of the data. Moreover, "private" is not an attribute of the address space, but rather of the access. When a user's primary address space is shared with a second virtual machine, the owner's access is not marked private, since prefix effects are appropriate for the primary space. The sharer's access would be marked private, to suppress application of the sharer's prefix to the addresses in the foreign space.

The force-private-space bit provides a method to allow these different views of the primary space while maintaining a single copy (in the ASTE) of the STD for a user's primary space. The private-space bit in the STD in the ASTE is set to zero to give the appropriate "non-private" view of the space to the owner when host CR 1 is loaded from this field. The force-private-space bit in the access-list entry of each sharer is set to one to give each sharer a "private" view of the address space.

The private bit and the ALEAX field in the access list entry provide high performance authorization mechanisms to grant or prohibit a program's access to an address space represented by the ALE. The private bit can be 0, thus allowing all programs which execute with the access list to access the address space represented by the ALE. The ALE private bit can be 1 and the EAX in host control register 8 can be equal to the ALEAX field. This allows programs with a particular EAX to access the address space represented by the ALE. Finally, the ALE private bit can be one and host control register 8 EAX can select an entry in the target space's authority table which has the S-bit equal to one. This allows multiple programs running with different EAXs to access the address space represented by the ALE.

Figure 10A:
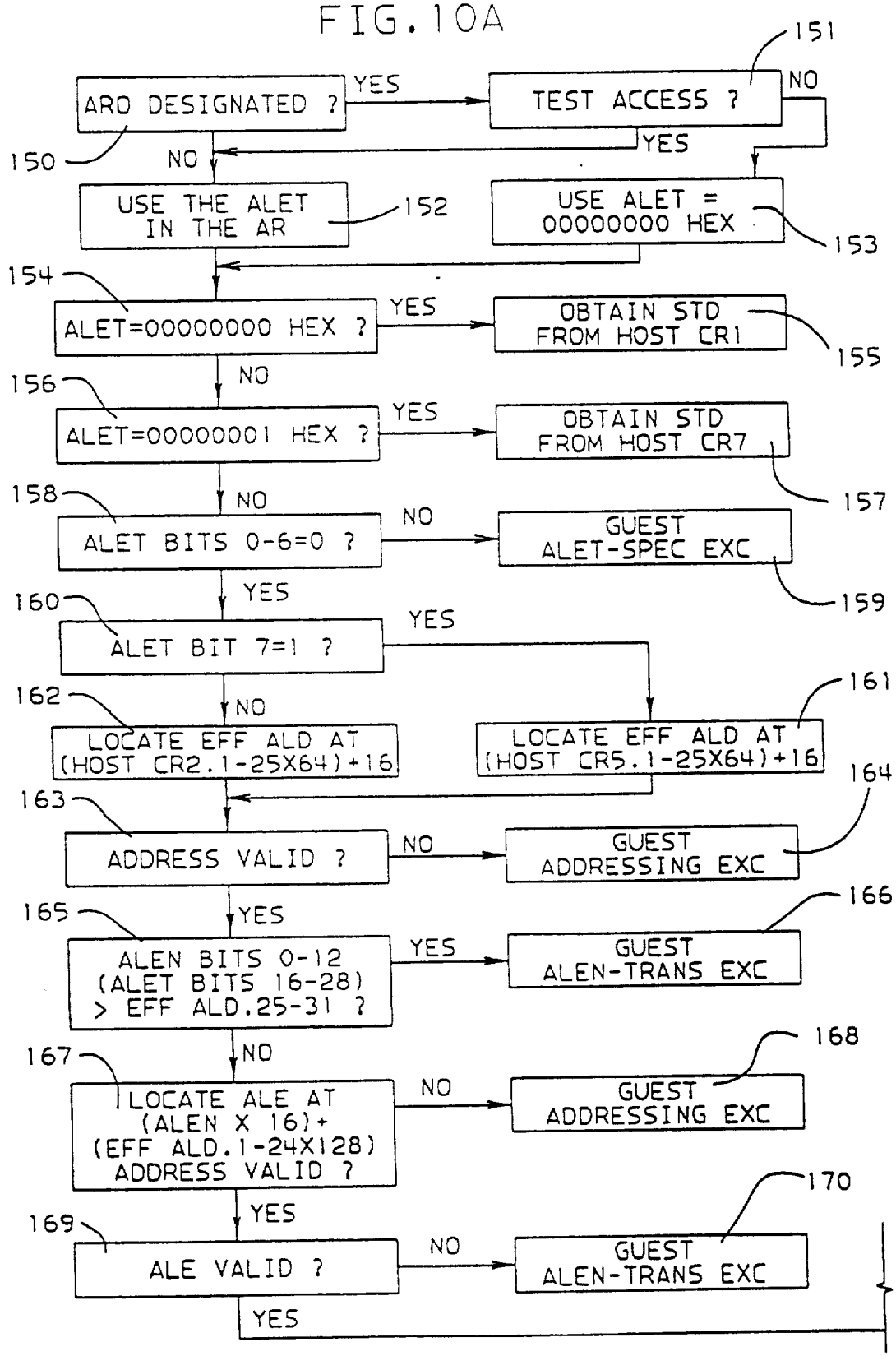
Figure 10B:
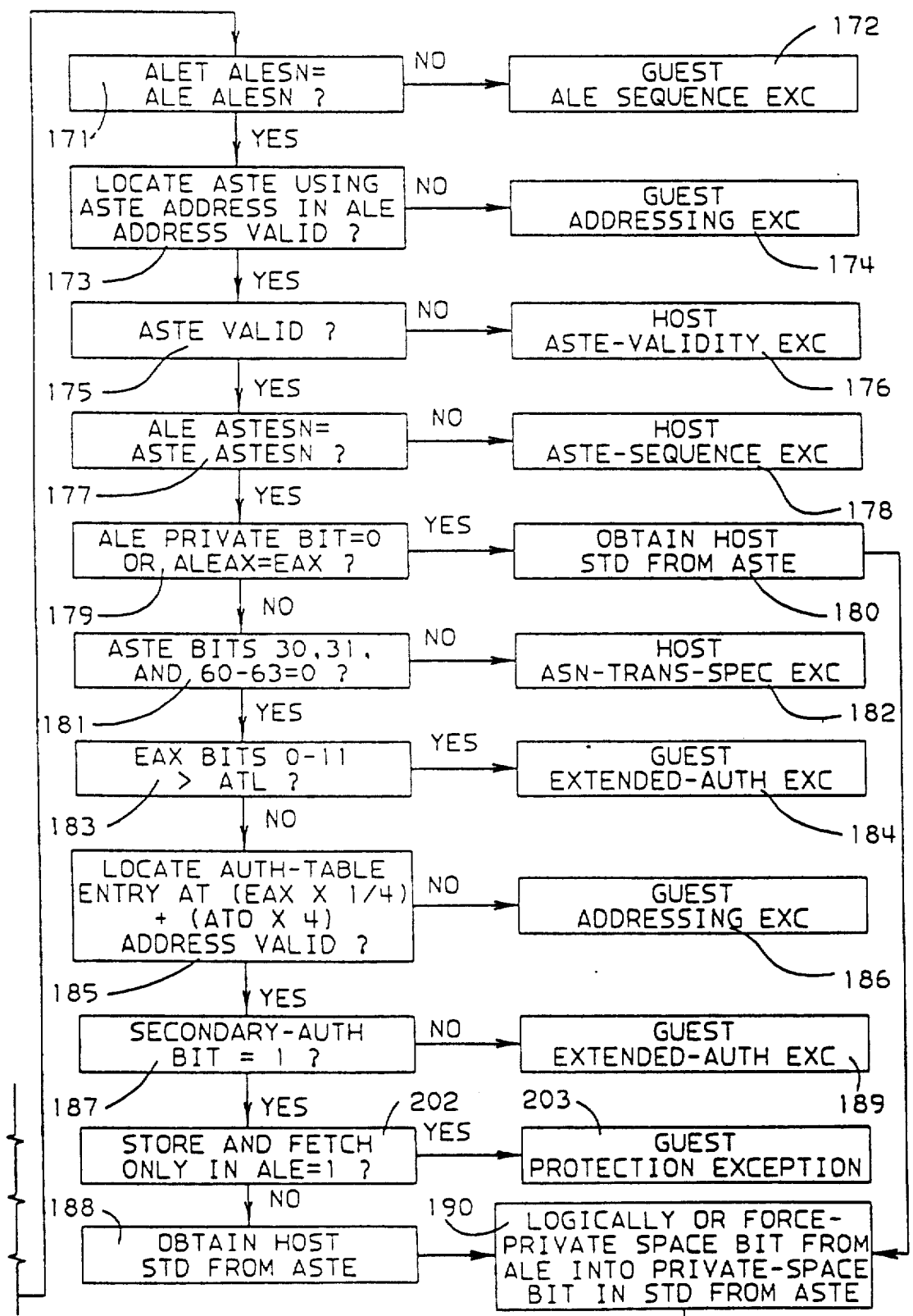

FIGS. 10A through 10C, when taken together, form a flow chart of the access register translation steps and exceptions. When the ART logic is invoked, a check is made at 150 to determine if access register 0 has been designated. If access register 0 has been designated, a check is made at 151 to determine if the ART was invoked by a TEST ACCESS operation. The TEST ACCESS operation is known in the prior art and thus will not be described in more detail here. If access register 0 was not designated, or if this is a TEST ACCESS operation, the ALET in the access register is designated for use at 152. If access register 0 is designated and this is not a TEST ACCESS operation, a 0000000 hex is assigned to the ALET at 153. A check is made at 154 to determine if the ALET is equal to 0000000 hex. If yes, the STD for the host primary address space is obtained from host control register 1 at 155. At 156, a check is made to determine if the ALET has a value of 00000001 hex. If yes, the STD for the host secondary address space is obtained from control register 7 at 157. A check is made at 158 to determine if bits 0–6 of the ALET are equal to 0. If bits 0–6 are not equal to 0, the assigned value of the ALET is not valid and a guest ALET specification exception is raised at 159 and the operation is suppressed.

A check is made at 160 to determine if the ALET bit 7 is 1. If it is, the PASTEO entry in host control register 5 is decoded at 161 and the effective ALD is fetched for the PSAL. If the ALET bit 7 is equal to 0, the DUCTO entry in host control register 2 is decoded at 162, and the effective ALD is fetched for the DUAL. If the fetching address is not valid at 163, a guest addressing exception is raised at 164, and the operation is suppressed. If the address is valid at 163, a check is made at 165 to determine if the ALEN of the ALET is outside the range of the effective ALL (bits 25–31 of the effective ALD). If it is, a guest ALEN translation exception is raised at 166, and operation is nullified. If the answer at 165 is no, the ALE is located at 167 and a check is made to see if the ALE address is valid. If the ALE address is not valid, a guest addressing exception is raised at 168 and the operation is suppressed. If the address is valid at 167, the valid bit in the ALE is checked at 169 to see if the ALE is valid. If the ALE is not valid, a guest ALEN translation exception is recognized at 170, and the operations is nullified. If the ALE is valid at 169, the ALESN of the ALET is compared to the ALESN of the ALE at 171. If the comparison at 171 is not equal, a guest ALE sequence exception is recognized at 172, and the operation is nullified. If there is an equal compare at 171, the ASTE is located at 173 using the ASTE address in the ALE. A check is made to determine if the ASTE address is valid. If the address is not valid, a guest addressing exception is raised at 174 and the operation is suppressed. If the ASTE address is valid at 173, the validity bit of the ASTE is checked at 175 to determine if the ASTE is valid. If the ASTE is not valid, a host ASTE validity exception is raised at 176, and the operation is nullified. At 177, the ASTESN of the ALE is compared with the ASTESN of the ASTE. If there is not an equal comparison at 177, a host ASTE sequence exception is raised at 178, and the operation is nullified.

The previous blocks 163–178 thus determine if the entries obtained are valid. At 179, the private bit of the ALE, bit 7, is checked to see if it is equal to 0. Also at 179, the ALEAX entry in the ALE is compared to the EAX in host control register 8. If either of the checks are equal, the host STD for the operand is obtained from the ASTE of the address space, as shown at 180.

The STD is modified at 147 by logically ORing the force private space bit of the ALE with the private space bit of the host STD and the result becomes the private space bit in the STD supplied to the guest prefixing and host DAT operations as shown in FIG. 19C. The remaining bits of the host STD are unchanged. When the private bit is 0, the program is authorized, and the authorization step of the access register translation is completed. When the private bit is 1 but the ALEAX is equal to the EAX, the program is also authorized, and the authorization step of the access register translation is completed.

If the program is not yet authorized at 179, then at 181, the validity of the ASTE is checked by determining if the ASTE bits 30, 31, and 60–63 are 0. If not, a host ASN translation specification exception is raised at 182 and the operation is suppressed. At 183, the value of the EAX bits 0–11 in host control register 8 is compared against the length of the authority table to make sure that the EAX does not designate an entry outside of the bounds of the authority table. If the comparison at 183 is yes, a guest extended authorization exception is raised at 184 and the operation is nullified. If the EAX designates an entry within the bounds of the authority table, the associated EAX entry is located in the authority table at 185. If the address of the authority table entry is not valid, a guest addressing exception is raised at 186 and the operation is suppressed.

An extended authorization check is made at 187 by determining if the secondary authorization bit (S-bit) of the authority table entry located at 185 is equal to 1. If the check at 187 is yes, the program is one of those authorized by the authority table associated with the address space, and the host STD for the address space is obtained from the ASTE at 188. If the comparison at 187 is no, the program is not authorized and a guest extended authority exception is recognized at 189, and the operation is nullified.

A check for access-specific protection is made at 202. If the access to be made is a store and the fetch-only bit in the access-list entry is one, a guest protection exception is recognized at 203, and the operation is suppressed. If no exceptions have been recognized, the STD for the address space is obtained from the ASTE at 188.

The STD is modified at 190 by logically ORing the force-private-space bit of the ALE with the private-space bit of the STD and the result becomes the private-space bit in the STD supplied to the guest prefixing and host DAT operations as shown in FIG. 10C. The remaining bits of the STD are unchanged.

If the private-space bit in the host STD is 1 at 191 then the offset is the host virtual address 192 supplied to the host DAT process at 193. If the private-space bit is a 0 at 191, then bits 1–19 of the offset are checked for zero at 194. If these bits are are all zero, then bits 1–19 of the offset are replaced with bits 1–19 of the prefix value from the state-description control block at 195 to produce the guest absolute address 196. If bits 1–19 are not zero, but instead match bits 1–19 of the prefix value from the state-description control block at 197, then bits 1–9 of the offset are replaced with zeros at 198 to produce the guest absolute address 196. If bits 1–19 of the offset are not zeros and do not match bits 1–19 of the prefix, then the offset is the guest absolute address 196. This completes the prefixing operation.

The guest absolute address is modified by the effective main-storage origin in the state-description control block and if the resultant address is invalid; that is if the resultant address is not less than or equal to the effective main-storage extent in the state description control block at 199, then a host translation exception condition is recognized at 200. Otherwise, if the resultant address is valid, then it is the host virtual address 201 which is used during the host DAT process at 193.

Advantageously, MCDS host art includes the ability to grant read-only access to an address space. This allows some guests to have read/write access to a space, and others read-only. This represents a significant enhancement over previous shared-memory capability in VM. Earlier versions of VM allowed "saved segments" to be imbedded into multiple virtual machines' absolute address spaces, but the shared data were writeable either by all or by none of the sharers. Control over an individual virtual machine's access allows a service machine, such as that for the CMS Shared File System, to load data securely into an address space, whence user machines can fetch the data directly.

Access list controlled protection is included in ESA/370 as well as MCDS. Therefore, CP can use this mechanism, rather than explicit testing in software, to enforce protection when simulating an operation for a guest. VM gives over the assignment of storage keys and PSW keys to the guest in each virtual machine, making keys inadequate to enforce authority across virtual machines. Access list controlled protection addresses VM's unique needs in this area.

Exception Conditions Recognized During Host Access-Register Translation The host-ART process can detect any of several exception conditions. These conditions are generally reported to the host, which can then take appropriate action. Often, the host's response is to present an exception to the guest. CP may transform a specific MCDS exception reported by the machine into an ESA/XC exception more meaningful to the application in the virtual machine.

For instance, when the owner of a shared space requests that the space be "isolated" from all sharers, CP increments a sequence number in the ASTE for the space. During ART, the machine compares the sequence number in the ALE with that in the ASTE it designates; on a mismatch, an ASTE-sequence exception is presented to the host. CP can thereby detect and prevent former sharers' attempts to access the space. In response to the MCDS ASTE-sequence exception, CP presents an ESA/XC addressing-capability exception to the guest indicating that its permission to access the space has been revoked.

Other exceptions recognized during host access register translation are presented to the guest. For instance, the guest is responsible for errors relating to an ALET in a guest access register. If an ALET in a guest access register is found to have an invalid format, an ALET specification exception is recognized and presented to the guest during host access register translation.

An exception which is caused by a guest attempting to access an invalid access-list entry is intercepted by the host. The host, in turn, presents the exception to the guest. This exception is called an ALEN-translation exception. ALEN-translation exceptions usually occur when the guest uses an old ALET which points to an access-list entry to which access has been previously revoked.

Access to an address space by a particular guest may be limited to read or the guest may be permitted to alter data in the address space. If a guest attempts to alter data which the guest may only read, a protection exception is recognized and presented to the guest.

Under MCDS, the operation of certain DAT-related instructions is modified to permit their operation without DAT when the guest is in MCDS mode. This allows an application program to use the same problem-program instructions to control host-ART under MCDS as it uses to control ART under ESA/370.

The INSERT ADDRESS SPACE CONTROL and SET ADDRESS SPACE CONTROL instructions are changed to be usable without DAT. INSERT ADDRESS SPACE CONTROL is used to obtain the current mode of the guest, either host-primary-space or host-access-register mode. SET ADDRESS SPACE CONTROL is used to set either host-primary-space or host-access-register mode.

FIG. 11 is a diagram showing the interrelationship between the MCDS facility, the system address spaces, the control program, and multiple CMS users. The MCDS facility 1100 uses data supplied by control tables 1108 managed by CP 1110, to enable CMS guests (which supply MCDS with host virtual addresses and ALETs) to have common access to any one of a number of data spaces 1106.

Now that the invention has been described with reference to the preferred embodiments, various modifications and changes may be made by those skilled in the art without departing from the spirit and scope of the invention as defined by the claims.

Having thus described our invention, what we claim as new and desire to secure by Letters Patent is:

1. An apparatus for providing common access to a plurality of host address and data spaces by a plurality of virtual machine guests emulated on a host computer system, comprising:

a computer system including a host and having a central processing unit and memory and having a host-virtual-memory host data space addressing structure which is accessed by the virtual machine guests with translation of guest storage addresses so as to provide access to the host data spaces addressed during execution of guest instructions, said host-virtual-memory host data space addressing structure including:

first means for receiving a guest real address as an offset from at least one of the virtual machine guests, the offset being representative of a data location in a host data space;

a plurality of host segment tables in said memory, one for each of the plurality of host data spaces, each of said host segment tables being represented by a host segment table designation;

second means for receiving a token from said one of the virtual machine guests and for determining data identifying the one of the host data spaces the offset is to be applied to from access to a host level translation table based upon said received token, and wherein said host level translation table comprises a host access list having plurality of entries, each of said entries being representative of corresponding said host segment table designation;

third means for receiving the offset from the first means and data identifying the one of the host data spaces from the second means and for deriving by means of translation a host absolute address representative of a data location in the one of the host data spaces based upon said offset and said identifying data;

wherein said plurality of virtual machine guests accesses privately or shares said host data spaces based upon identifying data in the entries of said host access list included in said host level translation table.

2. The apparatus of claim 1, wherein said third means further comprises:

guest prefix register means for storing a guest prefix value;

fourth means, connected to receive the guest prefix value from the guest prefix register means and the guest real address offset from the first means, for deriving a guest absolute address from the guest prefix value and the guest real address offset when enabled and for passing through without change the guest real address to become the guest absolute address when disabled; and, fifth means coupled to the fourth means, for enabling and disabling the fourth means responsive to a signal from the host computer system.

3. The apparatus of claim 2, wherein the fourth means comprises means for swapping the guest real address offset with the guest prefix value.

4. The apparatus of claim 2, wherein the second means includes:

token receiving means, for receiving the token from said one of the virtual machine guests;

referencing means, coupled to the token receiving means for accessing an entry in the host access list as selected by the token received by the token receiving means;

identification determining means, coupled to the third means, for obtaining data identifying the one of the host data spaces responsive to the host access list entry accessed by the referencing means; and wherein there is provided force private space means, coupled to the fifth means, for generating said signal responsive to the host access list entry accessed by the referencing means.

5. The apparatus of claim 4, wherein the third means further comprises:

sixth means, connected to receive the guest absolute address from the fourth means, for applying a main storage origin value to the guest absolute address to derive a host virtual address when the fourth means is enabled and for passing through unchanged the guest absolute address to become the host virtual address when the fourth means is disabled.

6. The apparatus of claim 5, wherein the third means further comprises;

seventh means, connected to receive the host virtual address from the sixth means and data identifying the one of the host data spaces from the second means, for performing dynamic address translation on the host virtual address to derive a host real address.

7. The apparatus of claim 6, wherein the third means further comprises:

host prefix register means for storing a host prefix value; and, eighth means for receiving the host prefix value from the host prefix register means and the host real address for the seventh means and for applying the host prefix value to the host real address to derive the host absolute address.

8. The apparatus of claim 5, wherein a bit in the data identifying the one of the host data spaces generates a private space signal coupled to the fifth means, for enabling and disabling the fourth means.

9. The apparatus of claim 8, wherein the fifth means enables and disables the fourth means responsive to a combination of the signal generated by the force private space means and the private space signal.

10. The apparatus of claim 1, wherein the guest real address is the offset received by the first means, and the token received by the second means originates in an access register.

11. The apparatus of claim 1, wherein the token received by the second means is accepted as an input and translated by the use of host token translation tables to obtain a host segment table designation, which host segment table designation is a designation of the host data space in which the guest real address offset is to be translated as required by a host dynamic address translation process, and wherein the host segment table designation comprises data identifying the selected host data space provided by the second means and received by the third means.

12. The apparatus of claim 1, wherein a process performed by the second means determines the identifying host segment table designation which is passed to the third means, and wherein said host segment table designation is obtained through a translation process which leads to the determination of the host segment table designation.

13. A method for providing common access to a plurality of host address and data spaces by a plurality of virtual machine guests emulated on a host computer system, comprising:

concurrently receiving a plurality of guest real address offsets and a corresponding plurality of tokens from at least one of the virtual machine guests, the guest real address offsets being representative of the identities of data locations in a plurality of host data spaces and the corresponding tokens being guest level representations of the identities of the host data spaces the offsets are to be applied to;

providing a plurality of host segment tables in a memory, one for each of the plurality of host data spaces, each of said host segment tables being represented by a host segment table designation; determining the host level identities of the host data spaces the guest real address offsets are to be applied by accessing a host level translation table based upon said received tokens;

wherein said host level translation table comprises a host access list having plurality of entries, each of said entries being representative of corresponding said host segment table designation;

deriving from the guest real address offsets and the host level identities of the host data spaces, host absolute addresses representative of data locations in the host data spaces identified by said determining step based upon said offsets and said host level identities;

wherein said plurality of virtual machine guests accesses privately or shares said host data spaces based upon identifying data in the entries of said host access list included in said host level translation table.

14. The method of claim 13, further comprising the steps of:

receiving a guest prefix value from said one of the virtual machine guests;

receiving a private-space signal from the host computer system; and responsive to the private-space signal, performing a guest prefixing process which derives a guest absolute address from the guest prefix value and the guest real address offset.

15. The method of claim 14, further comprising the steps of:

responsive to the private-space signal, performing a main storage origin process which applies a main storage origin value to the guest absolute address to derive a host virtual address.

16. The method of claim 15, further comprising the step of:

responsive to the host level identity of the host data space determined by the determining step, performing host dynamic address translation on the host virtual address to derive a host real address.

17. The method of claim 16, further comprising the step of:

applying a host prefix value to the host real address to derive the host absolute address.

18. The method of claim 17, further comprising the steps of:

storing data indicative of the host data spaces identified by the determining step in a look up table; and causing the virtual machine guest to read the data indicative of the host data spaces from the look up table instead of performing the determining step for a subsequent access to the host data spaces.

19. The method of claim 15 wherein the determining step further comprises the steps of:

receiving a token from said one of the virtual machine guests;

selecting, from within a host access list comprising a plurality of entries, the one entry corresponding to the token;

obtaining from the selected entry a force private space bit which is used as a control signal for determining if the guest prefixing process and the main storage origin process are applied; and, deriving from the selected entry the host level identity of the host data space which the guest real address offset is to be applied to.

20. The method of claim 19, wherein are included a guest prefixing process and a main storage origin process wherein a combination of the force private space bit with a bit in the host level identity of the host data space derives a private-space signal which controls the application of the guest prefixing process and main storage origin process.

21. The method of claim 13, wherein a host segment table designation is the host level identity of the host data space which the guest real address offset is to be applied to, said host segment table designation being required by a host dynamic address translation process, and wherein a host real address is derived from the host virtual address and the host segment table designation.

* * * * *